E. T. HORSEY.
PORTABLE VULCANIZER.
APPLICATION FILED MAR. 5, 1915. RENEWED MAY 11, 1916.
1,204,021.
Patented Nov. 7, 1916.
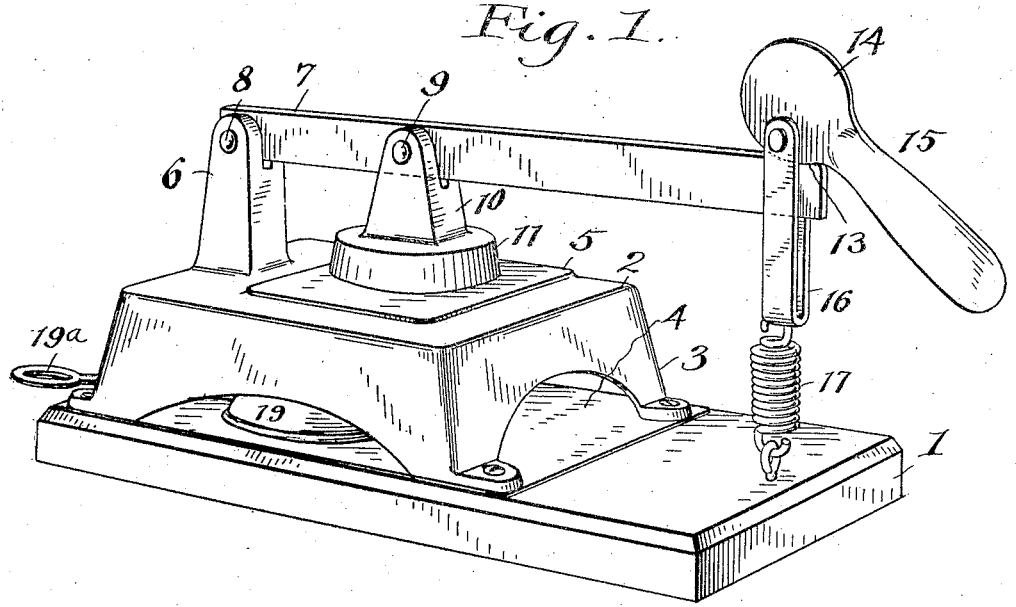
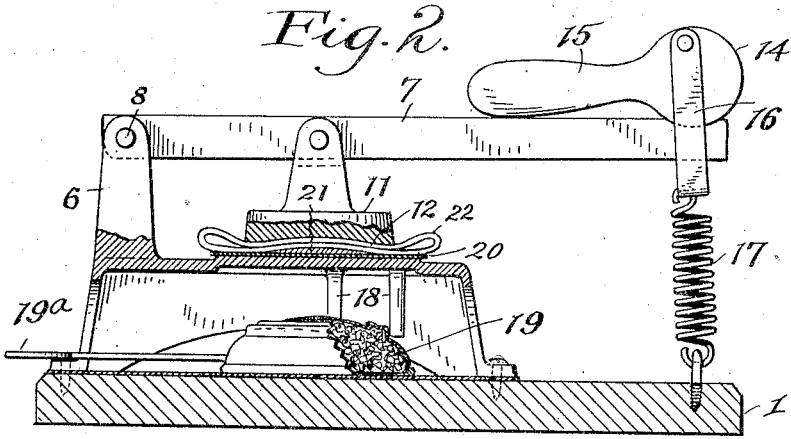
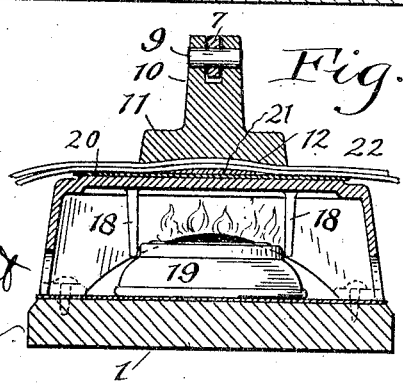

UNITED STATES PATENT OFFICE.

EDGAR T. HORSEY, OF CLEVELAND, OHIO.

PORTABLE VULCANIZER.

1,204,021.  Specification of Letters Patent.  Patented Nov. 7, 1916.

Application filed March 5, 1915, Serial No. 12,249. Renewed May 11, 1916. Serial No. 96,943.

*To all whom it may concern:*

Be it known that I, EDGAR T. HORSEY, a citizen of the United States, residing at Cleveland, in the county of Cuyahoga and State of Ohio, have invented a certain new and useful Improvement in Portable Vulcanizers, of which the following is a full, clear, and exact description.

This invention relates to a vulcanizer of the portable type. By this I mean a vulcanizer which is small in its dimensions, so that it may readily be carried from place to place, in fact, may be carried in an automobile so that repairs to tires may be made at any place and time wherein it may be convenient for the person making the repairs.

The objects of the invention are to produce a portable vulcanizer in which the parts heated in the vulcanizer are removed from the parts which secure the tire during the vulcanizing operation so that the same will not become heated, and further, to provide a portable vulcanizer in which a yielding pressure is placed upon the tire as it is repaired, causing the presser portion of the vulcanizer to follow the patch as it softens under the heat to keep the pressure upon the patch and tire constant.

Generally speaking, the invention comprises the elements and combinations thereof set forth in the accompanying claims.

Reference should be had to the accompanying drawings forming a part of this specification, in which—

Figure 1 is a perspective view of the vulcanizer; Fig. 2 is a side elevation with portions in section of the vulcanizer, and Fig. 3 is a front elevation with portions in section of the vulcanizer.

Upon a support 1, which may be of wood or any desired material, there is mounted a base 2 which is supported upon legs 3, the space between the legs is cut out as indicated at 4, so as to provide a circulation of air for purposes which will be later described. Upon the base 2 is a vulcanizing plate 5 which in the instance shown is formed as a part of the base 2. However, the plate 5 is polished and made substantially smooth so as to provide as near as practical an absolutely flat face against which the vulcanizing may be accomplished.

At the rear end of the base 2 there is an upwardly extending post 6 which is bifurcated. The post 6 receives the end of a lever 7, there being a pin 8 which extends through the post and the lever 7 providing a pivotal connection between the lever and post. Intermediate of the ends of the lever there is a pivot 9 which supports a bifurcated arm 10, and the arm carries either secured to it or as an integral part of it, a presser head. This presser head is slightly concaved as indicated at 12 in Fig. 2, for a purpose which will be later described.

At the outer end of the lever 7 there is a rounded depression as indicated at 13. This depression is adapted to receive the rounded head 14 of a lever 15. Secured to the lever and eccentric with respect thereto is a yoke 16 which straddles the lever 7, and the head 14. A spring 17 is at one end secured to the yoke 16 and at its opposite end secured to the support 1. The spring is secured in such a manner so that its connection is flexible.

As will be clearly seen by reference to Fig. 2 the base 2 is hollow and has extending downwardly therefrom pins 18, there being three of such pins, only two however, appearing in the drawings. These pins are for the purpose of positioning a lamp 19 thereby to bring the lamp into proper position to heat the plate 5. The lamp may be of any desired shape or construction, however, I prefer a lamp which may employ denatured alcohol or similar substances as its source of heat. The lamp is provided with a handle 19ª by which it may be removed from beneath the plate 5.

The operation and manner of use of the device is as follows: Preferably a piece of paper or similar material 20 is placed upon the plate 5. A patch 21 is placed upon a tube 22 in proper position to cover the puncture or hole in the tube and suitable vulcanizing cement is placed between the patch and tube so as to cause a union between the tube and patch. The presser head 11 is then placed against the tube and in position over the patch. The head 14 is then introduced into the groove 13 in the lever 7 and the handle 15 of the lever is swung into the position shown in Fig. 2. This places the presser head 11 under the tension of the spring 17. A quantity of inflammable material, such as denatured alcohol, is then placed in the lamp 19, the same ignited, and the lamp placed beneath the plate 5. The heat of the lamp will heat the vulcanizing plate, causing the cementing material between the patch and the tube to unite the patch and the tube in a manner which is well understood in the vulcanizing art. As the rubber is heated, it will flow and by giving the presser head 11 the concave inner surface as hereinbefore described, it will cause the material between the patch and the tube to flow outwardly, and so produce a feather edge to the patch. This will prevent the patch from scuffing up by the rubbing action between the inner tube and the outer when the repaired tube is subsequently used. As before stated, the heating of the material which is to vulcanize the patch and the tube causes the material to flow and also causes a certain amount of flowing between the skin of the tube and the skin of the patch of those portions which are adjacent to each other. The spring 17 being under tension will, under these conditions, cause the presser head 11 to continue its pressure with practically unabated force against the tube during this vulcanizing action, thus maintaining the pressure which will cause a complete and satisfactory union between the patch and the tube.

The quantity of inflammable material which will be used in the lamp 19 is dependent upon the time necessary to effect a cure of the vulcanizing material which is used. It is my purpose to supply material by which the repair may be made upon a tube so that definite instructions may be given as to the time during which the heat should be applied to the plate 5. Heat will be applied as long as there is inflammable material within the lamp 19, and it is the object to put in the lamp 19 only sufficient inflammable material to heat the plate 5 for the length of time which is desirable in order to effect a cure of the patch.

It is preferable to leave the tire and its patch in the vulcanizer until the tire and patch are somewhat cooled, so that the vulcanized rubber will have become solid, thus largely obviating any chance for the patch being peeled from the tube.

It will be noted that the portions of the vulcanizing apparatus which are handled by the operator are entirely removed from the portion of the device which is heated, that is to say, even if a tube be removed immediately from the vulcanizer, after the heat has been applied to the tube and patch a sufficient length of time, the parts which must be handled by the operator are so far removed from the portion heated that there is no danger of the operator burning his hands. During the short time which the vulcanizer is used it is practically impossible for the lever 7 and the handle 15 to become heated to any such extent as to make it uncomfortable for the operator to handle the same. This is a very important feature in that it permits the presser plate 11 to be removed carefully and obviates the danger of slippage between the patch and tire.

It is further desired to particularly call attention to the fact that during the vulcanizing action the tire and patch are constantly under the practically uniform tension of the spring 17 which holds the tire and patch closely together, and so assures a close union between the patch and tire.

Having described my invention, I claim:

1. In a portable vulcanizer, the combination with a hot plate, a presser head coöperating with the hot plate, a lever upon which the presser head is carried, and means beneath the hot plate for accommodating a heating means, a spring for holding the outer end of the lever which carries the presser head, and means engaging the lever for extending the spring.

2. In a portable vulcanizer, the combination with a hot plate, a presser head coöperating with the hot plate, a lever for supporting the presser head, a spring secured at one end, a cam member connected with the free end of the spring said cam member engaging the outer end of the said lever to place the spring under tension.

3. In a portable vulcanizer, the combination with a hot plate, a presser head coöperating with the hot plate, a pivoted lever upon which the presser head is carried, a spring secured at one end, a yoke engaging the free end of the spring, a cam lever engaging the outer end of the spring said cam lever being pivotally connected with the yoke whereby when the cam lever is operated the presser head is placed under spring pressure.

4. In a portable vulcanizer, the combination with a hollow base adapted to receive a heating device, a hot plate carried by said base, a presser head, a lever pivoted upon the base to which lever the presser head is pivoted, a spring secured at one end, a cam lever engaging the outer end of the lever which carries the presser head, operative connections between the cam lever and the free end of the spring whereby when the cam lever is operated the presser head is placed under pressure.

5. In a portable vulcanizer, the combination with a plate member, of a head member coöperating with the plate member, a pivoted lever upon which the head member is carried, a resilient means for holding the lever and means connected with the resilient means and engaging the lever for placing the resilient means under tension.

6. In a portable vulcanizer, the combination with a plate member, of a head member coöperating therewith, a pivoted lever upon which the head member is carried, a spring for holding the lever, a cam member connected with the spring and adapted to engage with the lever to place the spring under tension.

7. In a portable vulcanizer, the combination with two opposed members which may be moved toward and from each other and between which the material to be vulcanized is placed, devices for supporting each of said members, said devices being pivotally secured together at one point and a resilient means for holding them together at another point and means whereby one of the said members may be heated.

8. In a portable vulcanizer, the combination with two opposed members between which the work to be vulcanized is received, one of said members being mounted on a base, the other of said members being mounted upon a lever, the lever being pivoted to the base at one end thereof, a resilient member for engaging with the base and the end of the lever opposite the pivoted end, and means for heating one of the said members.

9. In a portable vulcanizer, the combination with two opposed members between which the work to be vulcanized is received, one of said members being carried by a base, the other of said members being carried by a device which is pivoted to the base, a spring and cam member to which the spring is secured, which spring and cam member coöperate with the base in the said device for drawing the said opposed members toward each other.

10. In a portable vulcanizer, the combination with two opposed members, one of which is flat and the other of which has a slightly concave surface between which members the work to be vulcanized is received, means for supporting each of said members, the said means at certain portions being pivoted together, and a spring coöperating with the said means for urging the said members toward each other.

In testimony whereof, I hereunto affix my signature in the presence of two witnesses.

EDGAR T. HORSEY.

Witnesses:
A. J. HUDSON,
C. V. SCHURGER.